United States Patent
Brown et al.

(10) Patent No.: US 7,274,974 B2
(45) Date of Patent: Sep. 25, 2007

(54) INDEPENDENT AUTOMATIC SHEDDING BRANCH CIRCUIT BREAKER

(75) Inventors: Scott R. Brown, Wake Forest, NC (US); Gary M. Kuzkin, Raleigh, NC (US)

(73) Assignee: Square D Company, Palatine, IL (US)

( * ) Notice: Subject to any disclaimer, the term of this patent is extended or adjusted under 35 U.S.C. 154(b) by 279 days.

(21) Appl. No.: 11/063,184

(22) Filed: Feb. 22, 2005

(65) Prior Publication Data
US 2006/0187600 A1 Aug. 24, 2006

(51) Int. Cl.
*H02J 7/00* (2006.01)

(52) U.S. Cl. .......................... 700/295; 307/7; 307/70; 307/76

(58) Field of Classification Search ................ 700/286, 700/292, 295, 296; 307/7, 70, 73, 76; 361/193
See application file for complete search history.

(56) References Cited

U.S. PATENT DOCUMENTS

| | | | | |
|---|---|---|---|---|
| 4,351,013 A | * | 9/1982 | Matsko et al. | 361/96 |
| 4,694,373 A | * | 9/1987 | Demeyer | 361/96 |
| 5,696,695 A | * | 12/1997 | Ehlers et al. | 700/286 |
| 6,842,668 B2 | * | 1/2005 | Carson et al. | 700/286 |
| 7,009,348 B2 | * | 3/2006 | Mogilner et al. | 315/307 |
| 7,043,380 B2 | * | 5/2006 | Rodenberg et al. | 702/62 |
| 7,142,950 B2 | * | 11/2006 | Rasmussen et al. | 700/286 |

OTHER PUBLICATIONS

Square D QO® Load Centers and Circuit Breakers Brochure (2004) 7 pages.
Square D Powerlink® G3 Lighting Control Systems Brochure (2004) 8 pages.

* cited by examiner

*Primary Examiner*—Leo P. Picard
*Assistant Examiner*—Douglas S Lee

(57) ABSTRACT

An independent automatic shedding system that automatically allows any combination of loads to powered under limited power availability (such as a standby power source) without overloading the generator or rewiring, while contributing to the stability of the power grid. A motorized disconnection actuation mechanism under control of a controller disconnects or recloses the contacts of a branch circuit breaker. A sensor detects the presence or absence of a power source and the type of power source, which is classified according to its type. A power source classification program is executed by the controller that interprets the sensor data and causes disconnection or reclosing of the disconnection actuation mechanism depending on a desired status (ON or OFF) of the branch circuit breaker when standby power is available. Conventional circuit protection is provided an optional advanced circuit protection such as ground or arc fault circuit interruption.

30 Claims, 4 Drawing Sheets

INDEPENDENT AUTOMATIC SHEDDING BRANCH CIRCUIT BREAKER

FIELD OF THE INVENTION

This invention is directed generally to power management control systems, and more particularly, to an independent automatic shedding branch circuit breaker system.

BACKGROUND OF THE INVENTION

Circuit breakers have long been used in industrial and residential applications to prevent damage to the loads connected to them and the building structures in which the loads are located. Normally, when an electrical fault or a current overload condition is sensed in a particular circuit, the breaker protecting that circuit "trips" and creates a physical disconnect in the circuit, thereby preventing the flow of electricity. To resume electrical flow to the circuit, the operator must physically reconnect the circuit breaker, typically by throwing a mechanical switch back to a closed position. These detection systems work automatically, tripping circuits only when certain conditions are satisfied.

In some electrical systems, a backup power source such as a generator or a standby power source is present. This configuration typically includes a main panel, a transfer switch, and a sub-panel for loads that will receive the backup power. The loads that are to be backed up are determined at the time of installation, and must be wired to the sub-panel. Thus, the wires must be physically moved to change the loads that are powered by the backup or standby power source. Loads that are not to be backed up are "shed" or removed from the power circuit when a backup or standby power source comes online. Care must be taken not to overload the backup or standby power source, so any rewiring to reconfigure the system must take into consideration the demands on the backup or standby power source. This manual process has a number of disadvantages—it can be dangerous, is prone to error, and is labor-intensive. Ineffective or suboptimal management of the loads can also disadvantageously result in instability on the power grid.

What is needed, therefore, is an independent automatic shedding branch circuit breaker that overcomes these and other disadvantages. The present invention addresses this and other needs, as more fully described below.

SUMMARY OF THE INVENTION

Briefly, according to an embodiment of the present invention, a branch circuit breaker for automatically shedding a load coupled to a power source includes disconnection means for disconnecting the load from the power source, a sensor for detecting the presence or absence of the power source, and a controller. The controller is programmed to execute a classification program that determines via the sensor whether the power source is connected and the classification of the power source (e.g., utility, standby, alternate). The controller is further programmed to cause actuation of the disconnection means responsive to the classification program. The disconnection means can include a motor, additional motorized contacts, or a relay. The sensor can include a voltage detection circuit such as a resistor divider or a potential transformer.

In another embodiment of the present invention, the branch circuit breaker further includes selection means for selecting a power state (e.g., ON or OFF) for the branch circuit breaker when power is to be supplied by a standby power source. To classify a power source, various parameters can be used, including the voltage, variations in voltage, voltage frequency, variations in voltage frequency, voltage harmonics, variations in voltage harmonics, and slot harmonics from a standby power source such as a generator.

In another embodiment of the present invention, multiple branch circuit breakers are used and selected ones are closed in a pseudo-sequential manner or random manner to help prevent startup currents on certain loads such as motors from overloading the power source and to help decrease the step change in load for the power source.

According to a method of automatically shedding loads coupled to a power source, the method includes automatically disconnecting a branch circuit breaker from the power source in response to a disconnection command from a controller, sensing the presence or absence of the power source, determining whether the power source is present or absent, automatically detecting the classification (e.g., utility, standby, alternate) of the power source, and executing a classification program that determines when to cause the automatically disconnecting based on the determining and the automatically detecting. In other embodiments, the method can further include automatically reclosing the load to the power source in response to a reconnect command from the controller, randomly delaying the automatic reclosing in response to the sensing, selecting a power state (e.g., ON or OFF) for the branch circuit breaker when power is to be supplied by a standby power source, automatically reclosing the branch circuit breaker when a standby power source is detected and when the branch circuit breaker is selected to be ON when a standby power source is detected.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
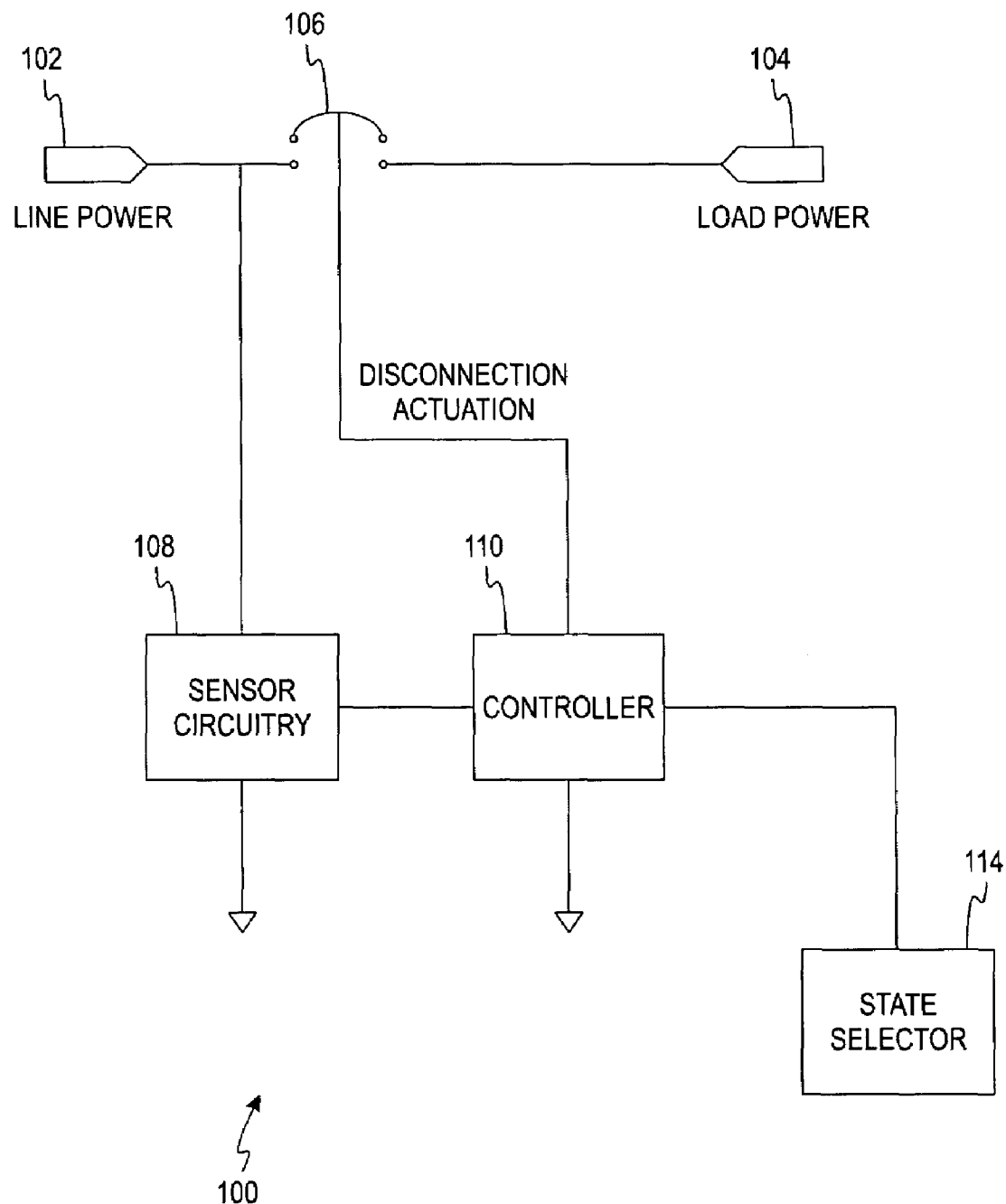
FIG. 1 is a functional diagram of an independent automatic shedding system connected between a line and a load for use in a branch circuit breaker according to the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring now to the drawings, and initially to FIG. 1, there is illustrated a functional diagram of an independent automatic shedding system 100 connected between a line and a load via a line contact 102 and a load contact 104, respectively, for use in a branch circuit breaker according to the present invention. The automatic shedding system 100 generally includes a disconnect operation mechanism 106, a power source sensor 108, a controller 110 that executes a power source classification program according to the present invention, a state selector 114, and a conventional circuit protection mechanism (not shown).

Figure 2:
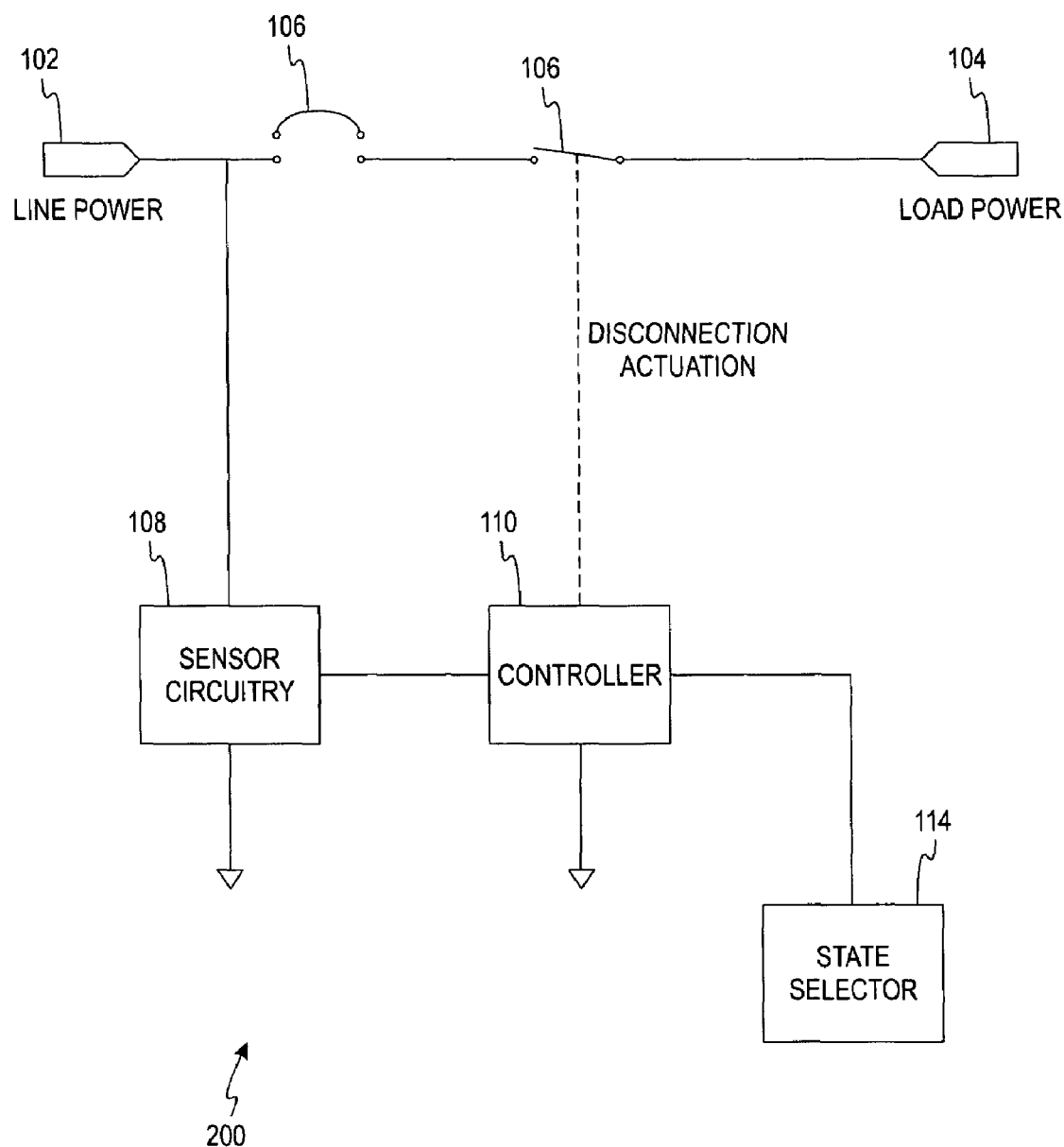
FIG. 2 is a functional diagram of an independent automatic shedding system similar to that shown in FIG. 1, except that the disconnection operation mechanism is in the form of additional contacts.

The disconnect operation mechanism 106 is the mechanism by which the controller 110 can physically and automatically disconnect and reclose (or reclosably disconnect) the load from the power source. In an embodiment, the disconnect operation mechanism 106 includes a motor that causes the branch circuit breaker contacts to move apart or together. A suitable commercial example of such a motor can be found in Square D's QO-PL Powerlink circuit breakers as described in U.S. Pat. No. 4,623,859. In other embodiments, the disconnect operation mechanism 106 includes additional motorized contacts (such as shown in FIG. 2) or a relay. The controller 110 is operable to cause actuation of the disconnect operation mechanism 106 such that it disconnects (or opens) and recloses (or reconnects) the branch circuit breaker to the connected power source. In an embodiment, the controller 110 sends a disconnect command to the disconnect operation mechanism 106 to cause it to open its contacts. To reclose the contacts, the controller 110 sends a reconnect command to the disconnect operation mechanism 106 to cause it to reclose its contacts.

The power source sensor 108 is used by the controller 110, via the classification program described herein, to detect the presence or absence of a power source. The power source sensor 108 is also used to classify the source or determine which of a group of sources (such as utility, backup/standby, alternate) is present. In an embodiment, the power source sensor 108 is a voltage detection circuit such as a resistor divider or a potential transformer. Isolation to protect the remainder of the circuit can also be optionally included.

The power source classification program executed via the controller 110 determines whether a power source is presently connected via the power source sensor 108, and if so, the classification of the connected power source (such as utility, backup/standby, alternate). The presence of the power source is determined by identifying the presence of a sinusoidal voltage in an expected range on the line side. Various parameters can be used to classify a power source, i.e., to determine whether the source is utility, standby generation, or another source. These parameters include the voltage of the power source, variations in the voltage, the frequency of the sinusoidal voltage of the power source, variations in the frequency of the sinusoidal voltage, the harmonic content of the voltage, variations in the harmonic content of the voltage, and the slot harmonics from a standby power source such as the voltage harmonics created by the output stator of a generator. It is expected that a standby power source exhibits greater variations in frequency, voltage, and voltage harmonics than a utility power source. These variations are quantified into the power source classification program.

The state selector 114 is used to select the power state (ON or OFF) of the branch circuit breaker when the power source is a standby generation power source. The state selector 114 can be a switch, a plug, or a programmable setting via the controller 110, a remote computer, or by the factory. By switching (either manually or programmably) the state selector 114 to an ON position, the operator is indicating that the branch circuit breaker is to be connected to the standby generation power source, otherwise the branch circuit breaker is to be disconnected in an OFF position. When multiple branch circuit breakers are used in accordance with the present invention, the state selector 114 of each branch circuit breaker allows the operator to control which loads will be connected to the standby generation power source in the event the utility power source is unavailable. The branch circuit breakers can be configured at the time of manufacture or in the field as a field setting for easy selection of the desired state for that particular branch circuit breaker.

The conventional circuit protection (not shown) can be any suitable circuit protection mechanism, such as that found in Square D's QO circuit breaker. The circuit protection should meet the applicable design requirements for protecting a branch circuit in a residence. Additional advanced circuit protection features can also be incorporated such as ground fault circuit interruption and arc fault circuit interruption.

Figure 3:
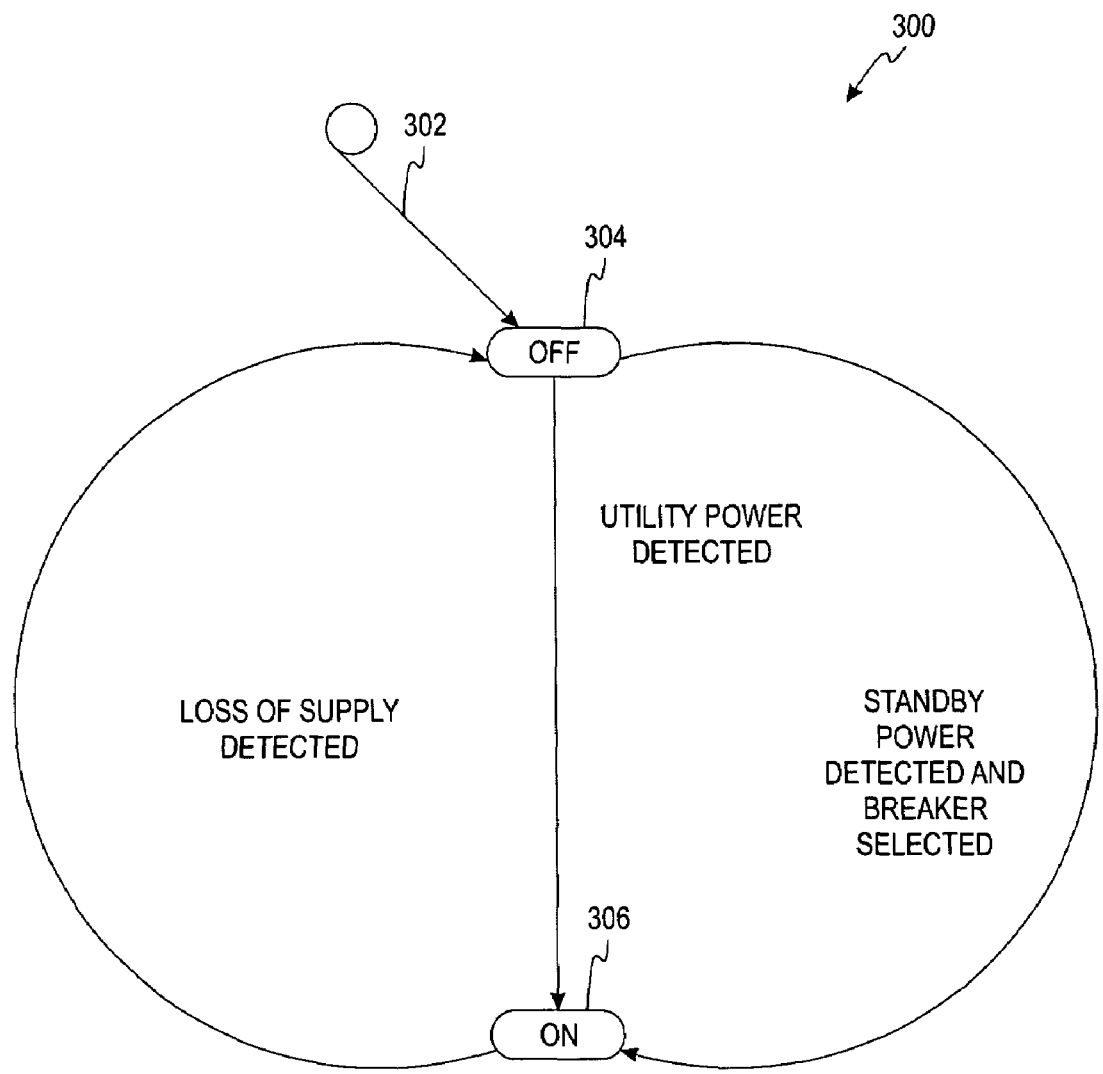
FIG. 3 is a state chart diagram 300 of the operation of the branch circuit breaker according to an embodiment of the present invention.

The controller 110 executes the power source classification program, interprets the state selector 114, and causes disconnection or reconnection of the disconnection operation mechanism 106 under control of the power source classification program. FIG. 3 illustrates a state chart diagram 300 of the operation of the branch circuit breaker according to an embodiment of the present invention. Initially, the state is unknown. When no power source is available, the branch circuit breaker is transitioned from an ON state (306) to an OFF state (304) via the disconnection operation mechanism 106. In the OFF state (304), a power source may become available. If a utility power source is detected via the power source sensor 108, the branch circuit breaker is transitioned from the OFF state (304) to the ON state (306). If the power source is a standby power source, the controller 110 checks the state selector 114 to determine the selected state of the branch circuit breaker. If the selected state is ON, then the branch circuit breaker is transitioned to the ON state (306) by reconnecting the disconnection operation mechanism 106. Otherwise, the branch circuit breaker remains in the OFF state (304).

A typical panel will have numerous branch circuit breakers, and in such an embodiment, a random or pseudo-random delay is implemented by the controller 110 to cause a pseudo-sequential closing of each branch circuit breaker so as to prevent multiple branch circuit breakers from turning on simultaneously. The pseudo-sequential closing process helps to prevent undesirable startup currents on certain loads such as motors from overloading the power source. It also decreases the step change in the load for the power source.

FIG. 2 illustrates a functional diagram of an independent automatic shedding system 200 connected between the line contact 102 and the load contact 104, respectively, for use in a load center panel housing multiple branch circuit breakers according to the present invention, where the disconnection operation mechanism 106 is in the form of additional motorized contacts. As noted above, a typical residence will have a panel containing numerous branch circuit breakers, all of which operate independently of one another to automatically shed their loads based on a dynamically reconfigurable power source classification program, in accordance with the present invention.

Multiple power sources may be available to the residence, and an independent transfer switch switches among the available power sources. Instead of pre-selecting and pre-wiring a set of standby loads to be active when a standby power source is activated so as to reduce the load on the standby power source, the power source classification algorithm of the present invention advantageously reduces the load on the standby automatically without a host or system-level controller.

Each branch circuit breaker has its own independently operating controller that can be programmed or preconfigured to shed its load(s). Additionally, the circuit branches that are active during standby power can be reconfigured without the need to remove the interior cover of the load center panel. The state selector 114 can be easily switched by the operator, either manually or via a programmable setting using the controller 110.

The independent automatic shedding system of the present invention results in a smoother operation whereby all branch loads are disconnected during an outage, and selected branch loads are pseudo-sequentially reclosed for standby generation. All branch loads return to normal operation when utility power is restored. The system advantageously extends the life of the branch loads, contributes to the stability of the grid, and minimizes manual intervention by the operator.

Figure 4:
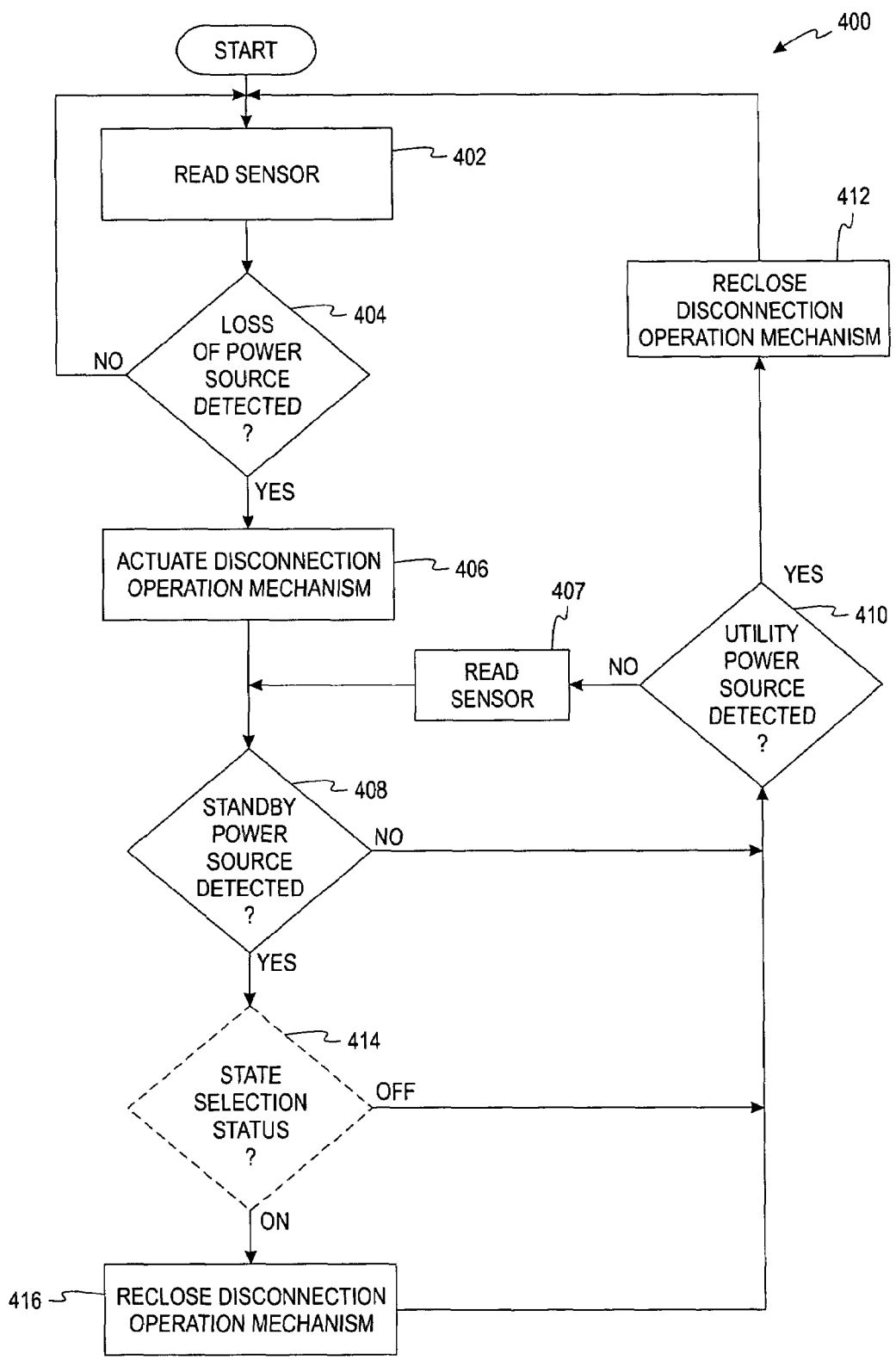
FIG. 4 is a flow chart depicting an automatic shedding procedure 400 for carrying out a specific embodiment of the present invention.

Turning now to FIG. 4, there is shown a flow chart depicting an automatic shedding procedure 400 for carrying out a specific embodiment of the present invention. The power source sensor 108 is read (402) and if a loss of power is detected (404), the disconnection operation mechanism 106 is actuated (406) to disconnect the branch circuit from the line supply. If a standby power source is detected (408) via the power source sensor 108, the state selector 114 is checked (414) to determine the desired status of the branch circuit breaker in the event of a utility power supply failure. If the desired status is ON for that particular branch circuit breaker, the disconnection operation mechanism 106 is reclosed (416) allowing the backup power to flow to the load(s) connected to that branch circuit breaker. If the desired status is OFF, the disconnection operation mechanism 106 is not reclosed and the controller 110 determines whether a utility power source is detected (410) via the power source sensor 108. The power source sensor 108 is read (407), and the standby power source is detected (408). If utility power source is sensed, the disconnection operation mechanism 106 is reclosed (412) and the system returns to normal operation. Otherwise, the power source sensor 108 is monitored until a change is detected. Note that the state selector status (414) does not have to be checked repeatedly. Once is sufficient, and then it may be bypassed until the next loss of power is detected.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A branch circuit breaker for automatically shedding a load coupled thereto from a power source, comprising:
    disconnection means for reclosably disconnecting said load from said power source;
    sensor means for detecting the presence or absence of said power source; and
    a controller programmed to
        execute a classification program that determines via said sensor means whether said power source is connected and its classification, and
        cause actuation of said disconnection means responsive to said classification program.

2. The branch circuit breaker of claim 1, further comprising selection means for selecting a power state for said branch circuit breaker when power is to be supplied by a power source other than a utility power source.

3. The branch circuit breaker of claim 2, wherein said controller is further programmed to determine the selected power state of said selection means.

4. The branch circuit breaker of claim 2, wherein said selection means includes a switch, a plug, or a programmable setting.

5. The branch circuit breaker of claim 1, further comprising a fault circuit interruption unit.

6. The branch circuit breaker of claim 1, wherein said disconnection means includes a motor, contacts, or a relay.

7. The branch circuit breaker of claim 1, wherein said sensor means includes a voltage detection circuit a resistor divider, or a potential transformer.

8. The branch circuit breaker of claim 1, wherein said classification of said power source is carried out by detecting a classification parameter of said power source.

9. The branch circuit breaker of claim 8, wherein said classification parameter includes voltage, variations in voltage, voltage frequency, variations in voltage frequency, voltage harmonics, or variations in voltage harmonics.

10. The branch circuit breaker of claim 8, wherein said classification parameter includes slot harmonics.

11. The branch circuit breaker of claim 1, wherein said classification includes an indication of a utility power source and a standby power source.

12. The branch circuit breaker of claim 1, wherein said controller is further programmed to cause reclosing of said disconnection means responsive to said classification program.

13. The branch circuit breaker of claim 12, wherein said reclosing of said disconnection means responsive to said classification program is randomly delayed relative to the reclosing of other branch circuit breakers coupled to said power source.

14. The branch circuit breaker of claim 1, in combination with other branch circuit breakers, wherein said branch circuit breaker and said other branch circuit breakers operate independently of one another.

15. A method of automatically shedding a load coupled to a power source, comprising:
    automatically disconnecting a branch circuit breaker from said power source in response to a disconnection command from a controller;
    detecting the presence or absence of said power source;
    determining, using said controller, whether said power source is present or absent;
    automatically detecting the classification of said power source from among a plurality of classifications; and
    executing on said controller a classification program that determines when to cause said automatically disconnecting based on said determining and said automatically detecting.

16. The method of claim 15, further comprising automatically reconnecting said load to said power source in response to a reconnect command from said controller.

17. The method of claim 16, further comprising randomly delaying said automatically reconnecting in response to said reconnect command.

18. The method of claim 15, further comprising selecting a power state for said branch circuit breaker when power is to be supplied by a power source other than a utility power source.

19. The method of claim 18, wherein said selecting is carried out with a switch.

20. The method of claim 18, wherein said selecting is carried out with a programmable setting using said controller.

21. The method of claim 15, further comprising automatically reclosing said branch circuit breaker in response to automatically detecting said classification as being indicative of a power source other than a utility power source and further in response to selecting an ON state of said branch circuit breaker.

22. The method of claim 15, wherein said automatically detecting includes detecting voltage, variations in voltage, voltage frequency, variations in voltage frequency, voltage harmonics, or variations in voltage harmonics.

23. The method of claim 15, further comprising automatically reclosing said branch circuit breaker in response to said automatically detecting the classification detects said classification as being indicative of a utility power source.

24. The method of claim 15, further comprising automatically disconnecting said branch circuit breaker in response to detecting an absence of said power source.

25. A branch circuit breaker that is programmed to shed its load automatically from a power source, comprising:
- a sensor coupled to a line contact in said branch circuit breaker;
- disconnection means for reclosably disconnecting said load from said power source;
- selection means for selecting among a plurality of power states of said branch circuit breaker when a utility power source is not available; and
- a controller coupled to said sensor, said disconnection means, and said selection means,
  said controller being programmed to
  cause said disconnection means to disconnect said load from said power source when said sensor detects an absence of said power source,
  determine a classification of a power source available to said branch circuit breaker based on at least one classification parameter,
  detect which one of said plurality of power states was selected by said selection means, and cause said disconnection means to reclose when said sensor detects a power source other than a utility power source and said one of said plurality of power states is an ON state.

26. The branch circuit breaker of claim 25, wherein said controller is further programmed to randomly delay reclosing of said disconnection means when other branch circuit breakers are coupled to said line contact.

27. The branch circuit breaker of claim 25, wherein said classification parameter is voltage, variations in voltage, voltage frequency, variations in voltage frequency, voltage harmonics, or variations in voltage harmonics.

28. The branch circuit breaker of claim 25, wherein said plurality of power states includes an OFF state and an ON state.

29. The branch circuit breaker of claim 25, wherein power source other than a utility power source is a backup power source.

30. The branch circuit breaker of claim 25, wherein power source other than a utility power source is an alternate power source.

* * * * *